(12) United States Patent
Steele et al.

(10) Patent No.: US 7,542,828 B2
(45) Date of Patent: Jun. 2, 2009

(54) UNMANNED AIR VEHICLE, INTEGRATED WEAPON PLATFORM, AVIONICS SYSTEM AND CONTROL METHOD

(75) Inventors: Daniel W. Steele, Clay, NY (US); Joseph R. Chovan, North Syracuse, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 529 days.

(21) Appl. No.: 11/160,645

(22) Filed: Jul. 1, 2005

(65) Prior Publication Data

US 2007/0023582 A1 Feb. 1, 2007

(51) Int. Cl.
*G01C 23/00* (2006.01)
*B64C 13/20* (2006.01)

(52) U.S. Cl. .................... 701/3; 244/75.1; 244/190
(58) Field of Classification Search .............. 701/1, 701/3–4, 11, 14; 244/158.1, 75.1, 190
See application file for complete search history.

(56) References Cited

U.S. PATENT DOCUMENTS 7,299,130 B2 * 11/2007 Mulligan et al. ............ 701/213

2008/0027591 A1 * 1/2008 Lenser et al. ................ 701/2

\* cited by examiner

*Primary Examiner*—Yonel Beaulieu
(74) *Attorney, Agent, or Firm*—William Greener; Bond, Schoeneck & King, PLLC (57) ABSTRACT

A small, reusable interceptor unmanned air vehicle (UAV), an avionics control system for the UAV, a design method for the UAV and a method for controlling the UAV, for interdiction of small scale air, water and ground threats. The UAV includes a high performance airframe with integrated weapon and avionics platforms. Design of the UAV first involves the selection of a suitable weapon, then the design of the interceptor airframe to achieve weapon aiming via airframe maneuvering. The UAV utilizes an avionics control system that is vehicle-centric and, as such, provides for a high degree of autonomous control of the UAV. A situational awareness processor has access to a suite of disparate sensors that provide data for intelligently (autonomously) carrying out various mission scenarios. A flight control processor operationally integrated with the situational awareness processor includes a pilot controller and an autopilot controller for flying and maneuvering the UAV.

11 Claims, 9 Drawing Sheets

UNMANNED AIR VEHICLE, INTEGRATED WEAPON PLATFORM, AVIONICS SYSTEM AND CONTROL METHOD

Embodiments of the invention pertain generally to an unmanned air vehicle (UAV) and to a method for enhanced control of an autonomously controlled vehicle. More particular embodiments are directed to an integrated interceptor UAV weapon platform, an interceptor UAV avionics system and methods for designing and controlling an interceptor UAV.

BACKGROUND OF THE INVENTION

The technology, development and deployment of small unmanned air vehicles UAVs is becoming pervasive. Small UAVs provide a desirable and strategic sensor platform for close support operations including those associated with surveillance, reconnaissance, targeting and battle damage assessment. In the hands of a military adversary, these small UAVs become a threat. They can be used against assets and infrastructure deployed in the air, on the ground and on water. For example, naval vessels are particularly vulnerable to small scale attack when underway or at port. Their low cost and ease of deployment have the potential to make them ubiquitously present in large numbers and in simultaneous mission scenarios.

The use of conventional manned aircraft, missiles and larger unmanned aircraft to interdict small scale air, water and ground threats is an inefficient use of resources. Such a strategy puts human life at risk as well as equipment whose value may be far in excess of the tactical value associated with interdiction. In addition, the use of conventional available resources inhibits these same resources from being used for more appropriate engagements. Arguably, the relatively long persistence required to detect and effectively track and interdict small threats, especially where detection is carried out from the interdiction platform itself, precludes the use of missiles and higher performance aircraft in general. Certain missions also inherently demand "low-observability" features not provided by more conventional interdiction platforms.

In a 'fight fire with fire' approach, a conventional small UAV might be used as an interdiction platform against an adversary small UAV. However, the normal decision-making hierarchy, its necessary asset base and associated latent response time provide a sub-optimum response to the small UAV threat potential. From a technical perspective, small UAV interceptor platforms must be highly maneuverable. They require close proximity to surface and interfering objects typical of small UAV interdiction. They also require an effective weapons system that can be forgiving of small aiming errors. Conventional small UAVs and small surface craft have relatively modest speed and maneuverability and incorporate little awareness of small aerial countermeasures. Moreover, they lack any significant weapons capability. Those skilled in the art understand that more is required than the mere ad hock adaptation to retrofit conventional small UAVs. Some of the fundamental issues presented in an effective small UAV interceptor design include appropriate weapon integration, torque management from weapon discharge, high G-force airframe design, the selection of fusable search and track sensor technologies and intelligent (autonomous) maneuverability of the UAV interceptor platform.

Accordingly, there is a recognized need for a small interceptor UAV, an associated weapon platform, a UAV avionics system, and a control methodology that addresses the challenges outlined above. A UAV airframe, weapons system, avionics system and method should provide for effective, autonomous management and execution of different mission scenarios. A small UAV should be highly integrated, relatively compact and modular for ease of retrofit and portability, and designed and constructed in a manner that maximizes survivability under demanding and hostile conditions. Systems also benefit from being cost effective for application in large numbers to achieve parity against multiple and simultaneous threats.

SUMMARY OF THE INVENTION

An embodiment of the invention is directed to a method for designing a small interceptor unmanned air vehicle, referred to herein as a UAV. As used herein, the term "small UAV" refers to a fixed-wing unmanned air vehicle weighing in the range of 10 lbs to 300 lbs, and nominally on the order of about 100 lbs. A person of ordinary skill in the art will more precisely understand the meaning of the term 'small UAV'. The term 'interceptor UAV' used in reference to the embodiments of the invention described herein refers to a small UAV having the capability to seek, track and attack with- or destroy by-firepower, a small scale air, water or ground-threat target. Such targets may be stationary or mobile and may comprise, for example, adversary UAVs. An effective interceptor UAV benefits from a high performance airframe with an integrated weapon platform and integrated sensors. An advantageous design maintains low cost in order to achieve parity with that associated with intended threats, driving requirements that favor UAV interceptor recovery for reuse. Optimizing design considerations will provide an interceptor UAV that is capable of locking on to a target and precisely tracking it at close range, while discharging a weapon that in turn can be forgiving of small errors in aim. Also important is the ability for the interceptor to avoid obstacles in the pursuit of it's mission. The maneuverability requirements of an interceptor UAV will place high stress loads upon the interceptor airframe. To achieve such high maneuverability, a high-gain, rapidly responsive, closed-loop integration between onboard sensors and the airframe is a key design consideration. Precision aiming of an onboard weapon is another key attribute. It is highly advantageous that weapon aiming be inherently stable and relatively free from asymmetrical flight aerodynamics that may induce interceptor orientation preferences. It is further advantageous that a relatively small and lightweight interceptor airframe be resistant to shocks introduced by the discharge of the weapon and be capable of quickly mitigating any unresolved projectile discharge-induced torque effects upon the interceptor UAV's flight path. It is also advantageous that an onboard weapon be capable of repeated discharge to maximize the probability of a successful engagement and thereby increases its cost effectiveness. It is also beneficial to be able to freely orient platform/platform mounted sensors for maximum utility, with minimal aerodynamic compromises. The design of an interceptor UAV according to an embodiment of the invention will therefore benefit from a robust combination of the above attributes, in a simple, small, compact and well integrated design.

According to an embodiment of the invention, a method for designing a small interceptor UAV involves selecting a suitable weapon having an aiming axis and designing a winged airframe of the UAV around the weapon, wherein the airframe has a flight vector axis that is parallel to the aiming axis, such that weapon aiming is performed by maneuvering the UAV in flight. This design methodology essentially results in a self-aiming winged weapon. According to an exemplary aspect, a suitable weapon platform is an automatic repeating shotgun. A shotgun, when loaded with bird shot, is a formidable weapon against small targets at close range. An automatic repeating shotgun allows multiple discharges towards a threat to further the chances of a successful engagement. An automatic shotgun also provides a significant reduction in discharge reaction forces through countering momentums of internal reload components. A shotgun is a highly standardized weapon having low production cost and ease of maintenance. It can utilize a variety of readily available ammunition types as well as custom developed ammunition. According to an aspect, the design method then involves selecting a symmetrical aerodynamic airframe design, which results in optimized maneuvering flexibility. The design method further involves equipping the interceptor UAV with a vehicle-centric avionics platform (described below) to further provide substantially autonomous flight control of the UAV.

Another embodiment of the invention is directed to a small interceptor unmanned air vehicle referred to herein as a UAV. As discussed above, an important consideration of an interceptor UAV embodiment of the invention is optimum maneuvering flexibility for effective target engagement with an integrated weapon platform. The inventors recognized that key attributes of a compact, low weight, relatively simple and integrated UAV design provided close proximity between the UAV center of gravity and the weapon mounting, engine, wings, fuel, ammunition and other major components to minimize heavy structural requirements. Thus all major torque-inducing components are structurally combined at a common area near the airframe's center of gravity. According to an embodiment, a small interceptor UAV includes a generally cylindrical airframe having a longitudinal-rotational-flight vector axis and a known center of gravity location along the axis, a firewall region located just forward of the center of gravity location, a weapon platform mounted to the airframe having an aiming axis as coincident as possible with the flight vector axis, an avionics system located in a forward section of the airframe, a set of canards mounted symmetrically around a forward section of the airframe, a primary wing structure attached to a rearward section of the airframe, and a propulsion system mounted in an aft end of the airframe. The airframe structure is aerodynamically symmetric; i.e., the canards and wing structure are symmetric with respect to horizontal and vertical reference planes centered on the longitudinal axis of the airframe. In an aspect, a box beam assembly is used to tie major components together adjacent to the UAV's center of gravity. According to an exemplary aspect, the weapon platform consists of a 12-gauge automatic repeating shotgun. In an aspect, the wing structure is a non-dihedral delta wing structure. According to another aspect, the UAV will largely incorporate autonomous, self-sufficient intelligence through an avionics system-sensor platform that allows the UAV to implement threat solutions independent from direct human control. Utilizing such a platform, emphasis is placed on maintaining an effective internal world view model that is continuously updated with new sensor information. This world view model can be thought of as providing a situation awareness capability.

According to another aspect, sensor and armament pointing become highly dependent on the maneuverability and precision flight dynamics of the UAV platform itself. In this aspect, the UAV avionics system comprises a situational awareness processor including a data management system that utilizes a vehicle-centric database, which is UAV platform attitude invariant. The database has a four-dimensional, spherically organized data structure characterized by spatially evolutional sensor information and/or temporally evolutional sensor information (described in further detail below).

Another embodiment of the invention is directed to an avionics system for a UAV. According to embodiments of the invention, the UAV will have a high degree of autonomy provided by an avionics-sensor platform that allows the UAV to implement threat solutions substantially independent from direct human control. In an aspect, the UAV will have a selectable set of operational modes that parse the degree of autonomy into mission or mission segment driven options that a human operator can command, before and/or during execution. A principal component of this embodiment is an integrated suite of disparate, onboard sensors (sensor platform) whose data can be selectively accessed, fused and utilized by an avionic control system. Sensor types may include passive radio direction finder/receiver sensors known as electronic support measure (ESM) receive sensors, short-wave infra-red (SWIR) sensors, long-wave infra-red (LWIR) sensors, video cameras, millimeter wave (MMW) radar, and others known in the art. In an aspect, an ESM receive sensor is particularly advantageous as a long range search sensor. Many small scale threats such as small remotely operated vehicles, UAVs, UUVs, USVs etc. utilize radio communications for both control and sensor data relay. Often the data sent by such threats is the very reason for their use and is thus intrinsically linked to their function. A radio search for such small threats can be assisted by priming the interceptor UAV's direction finder with knowledge about potential threat radio emissions (frequency, etc.) and possible threat locations, to increase search efficiency. An illustrative interceptor UAV engagement would be as follows: a radio search to detect the threat, followed by radio direction finding to establish a radio bearing to the threat, a radio bearing controlled flight along the threat bearing to a point where an optical/IR sensor establishes a handoff for fine track/threat lock-on providing positive ID with potential for targeting of an on-board interceptor weapon and subsequent threat neutralization.

The hardware and software interfaced to the sensor platform, which provide the primarily autonomous control of the UAV, are collectively referred to as the avionic control system. According to an embodiment, the avionic control system comprises a situational awareness processor including a data management system. The situational awareness processor incorporates a vehicle-centric database that is UAV platform-attitude invariant. The database has a spherically arranged organizational data structure characterized by evolutional spatial information and/or evolutional temporal information from the sensors. The avionic control system further includes a flight control processor operationally connected to the situational awareness processor. The flight control processor includes an operationally integrated pilot controller, driven by sensor derived intelligence, and an autopilot controller, driven by navigational priorities. In an illustrative aspect, the pilot controller operates in both an attitude invariant saccade modality to search for targets and obstacles, and in a fixation modality to track targets. The autopilot controller has the real time UAV navigational responsibility to reconcile longer term flight plans/profiles with shorter term target acquisition and track inputs from the pilot controller. The autopilot therefore acts as the interface between the pilot function and flight control surface servos to essentially fly the UAV. A benefit of the situational awareness design is a simple, direct and effective means to guide the interceptor safely towards its ultimate targeting goal. Guidance is deemed to account for the majority of the effort and time involved in target convergence.

Guidance has two primary objectives: finding and tracking the target, and avoiding obstacles that may be a threat to a safe arrival at the target.

Inherent simplicity of the system is achieved by representing and organizing all significant operational data into a situational awareness sphere, wherein the data is angularly represented. Such representation is a natural extension of the presentation of raw sensor data, which inherently resolve the world in an angular sense (e.g., camera pixels, radar pointing, radio direction finding, etc.). Certain sensors or sensor combinations can also resolve or infer range information as well. This information is managed by the spherically organized data base as a function of radial placement. Such simplicity is advantageous in regards to keeping the size, weight and power associated with small, autonomous UAVs and associated systems at a practical level.

The most typical conventional world-view guidance systems map and/or transform input data into a Cartesian coordinate system in an attempt to make more expansive, globally-related measurements and then deterministically resolve subsequent guidance. This results in a need to appropriately unwind this transformation back to the angular world in order to issue vehicle guidance and control relevant commands to, in this case, converge on an interception. This conventional type system involves technical complexity relative to always keeping the (active) world view in an angular world, and dealing with it in its native format. With many sensors, range is not immediately available, resulting in an inability to locate this data directly into such a representation.

According to an aspect of the avionics system embodiment, Cartesian data such as that available from an onboard GPS system is omni-directionally viewed and thereby transformed into the angular world as the vehicle moves through space and directly combines with the vehicle's other onboard sensor data while "disappearing" (along with this data) into the sphere's center as data becomes irrelevant due to time and distance (i.e., the data id auto-aged). In this case, a defacto 'GPS camera' is implemented to map such pertinent data into the situational awareness world. According to an aspect, the situational awareness sphere also provides for independent windowing and parallel processing of data for both simultaneous tracking and obstacle avoidance. The direct use of angular sensor data allows not only the installation of data derived in parallel, as from a 2-D camera image, but also allows a succession of time and angularly separated imagery from the sensors to be easily "paint-brushed" into the spherical context to create a richer, wider field of view within the completely spherical "field of regard" that the situational data base provides. Thus a means is provided for the system to scan in data from sensors with small instantaneous fields of view through cooperative platform motions and/or sensor orientations. This composite data representation (multiple sensors, multiple passes) in turn allows conventional tracking algorithms and more unconventional "flow field" algorithms to operate on the composite imagery thus formed. The provision of a more direct and complete organization for environmental awareness data, as a moving field surrounding the UAV, offers effective and intelligent choices. They include what data to acquire, what inquiries are to be made and what algorithms to utilize in dealing with the spatial data that flows through the situational awareness sphere as the vehicle progresses through its environment.

Thus, according to an embodiment, a common situational data base is implemented to accomplish multiple objectives. This is important in carrying out a successful intercept mission in the sense of being able to converge on the target while avoiding obstacles along the way. The use of multiple, independently steered (angular) windows accomplishes this complex objective. In an exemplary aspect, two independent windows facilitate a target seek function and a target track function. The invention is not so limited, however, as there could be a single, or more than two, windows directed to different applications or mission segments. Angular gating or windowing, as used herein, provides independent and restrictive looks at the data base. Restrictions are designed by application to offer maximum clarity of interpretation. Windows are placed and steered with independent goals, each with independent processing means that in turn can be carried out in parallel.

The steering or orientation of these windows is a pilot controller function (described in greater detail below), that may advantageously be performed in concert with UAV interceptor mission functions. There is freedom in widow placement with regards to other windows, current sensor pointing and vehicular orientation and direction. For example, one window could be seeking ground objects that must be avoided for safety, while another is independently tasked to track a target. The obstruction seeking window could be oriented by the pilot controller to look straight ahead, about the spherical horizon, with an image flow field algorithm used as an alerting function when a potential obstruction appears to be on a collision course with the vehicle. Meanwhile the target tracking window, within which a tracking algorithm is operating, is providing the pilot controller with optimum interception information. The pilot controller is tasked to appropriately meld multiple sensing algorithm results in order to determine an acceptable range of maneuvering and a single sequence of platform guidance maneuvering to serve all platform needs. Proper maneuvering will keep an appropriate (sampled) stream of sensor data flowing into the database, maintain the UAV over a long term convergence trajectory and, in the short term, avoid obstructions through rapid departures from a direct convergence trajectory as required.

The avionics system includes the aforementioned pilot controller and autopilot controller. According to the embodiments, the pilot and autopilot functions within the interceptor design are purposefully separated. Autopilot systems and functions are generally known in the art, however, pilot functions in the context of an autonomous interceptor UAV are not. Autopilot functions as applied to current aircraft control systems accomplish the "flight" function without the need for continuous human pilot interaction. Stable flight requires sensory inputs indicative of vehicle location, orientation, speed, direction and accelerations. In UAV applications, the sensors typically employed for this include GPS, compass, altimeter, and multi-axis accelerometers. Sensor functions may somewhat overlap, however, it is the auto-pilot's task to sort this out by performing the appropriate algorithms and control to manage autonomous flight over defined courses. These functions include accelerometer integration (inertial guidance), course related way-point programming and continuous streams of steering commands to control surface servos that produce stable flight over a defined course. The steering commands are executed with regards to stored maps and related data on a moment-to-moment basis. Thus the routine maintenance of stable flight over a predefined (or real-time pilot-definable) course is removed to free the human pilot, or in the case of the interceptor UAV according to embodiments of the invention, the autonomous pilot, for higher order tasks. The higher order pilot function is reserved for tasks including, e.g., goal-directed behavior, monitoring airspace for targets and hazards, related instantaneous flight path/course changes and instantaneous changes to operational settings of flight-critical subsystems and weapons management. The instantaneous goal directed nature of pilot-controlled behavior is particularly advantageous to the interceptor. Outputs from the pilot controller are used to perturb and, to a degree, usurp autopilot stasis at a high priority level, above that of simply going from point "A" to point "B". However, during such interaction it remains important that the UAV maintain knowledge of where it is both in orientation and location, and remain flying over both longer and shorter timeframes. While these remain the tasks of the auto-pilot, the pilot works through the autopilot to command it to perform specific and timely maneuvering, which is particularly critical to the convergence portion of the interceptor mission. According to a contemplated aspect, the autopilot may provide predefined 'aerobatic' flight sub-sequences that the pilot can effectively invoke with execution parameters designed to optimized convergence. In any event, the pilot has the continuous need to be aware of the situation surrounding the vehicle, through steering of platform sensors, and windows within the situational awareness sphere. Thus goal-directed pilot behaviors include such awareness management and resulting indirect convergence related inputs to the auto-pilot.

Another embodiment of the invention is directed to a method for providing enhanced control of an autonomously controlled vehicle and, in a particular aspect, controlling a UAV. The above outlined system and apparatus embodiments support such methods. According to the embodiment, the steps include providing a spherically organized situational awareness data base, wherein at least one independent window is formed as a volumetric slice thereof, the window providing a view of operational data supplied by a sensor platform operationally integrated with the data base, and providing a pilot controller operationally integrated with the spherically organized data base, wherein at least one pilot modality is processed and supplied as a control signal for the vehicle. The independent window according to an aspect is a tracker engagement window, a seeker engagement window, or both. These windows deal independently with the angular and temporal data slices provided by the sensors within the attitude invariant data base. The windows are freely positionable within the world-space oriented spherical data base. The current angle of flight can then be represented as a unit vector, appropriately window-angle independent, originating from the center of the sphere.

The disadvantages, shortcomings and challenges in the current state of the art, as well as objects and advantages of the invention will be addressed and met by embodiments of the invention described below with reference to the detailed description and drawings that follow, and by embodiments of the invention as defined in the appended claims.

DETAILED DESCRIPTION OF A PREFERRED EMBODIMENT OF THE INVENTION

Figure 1:
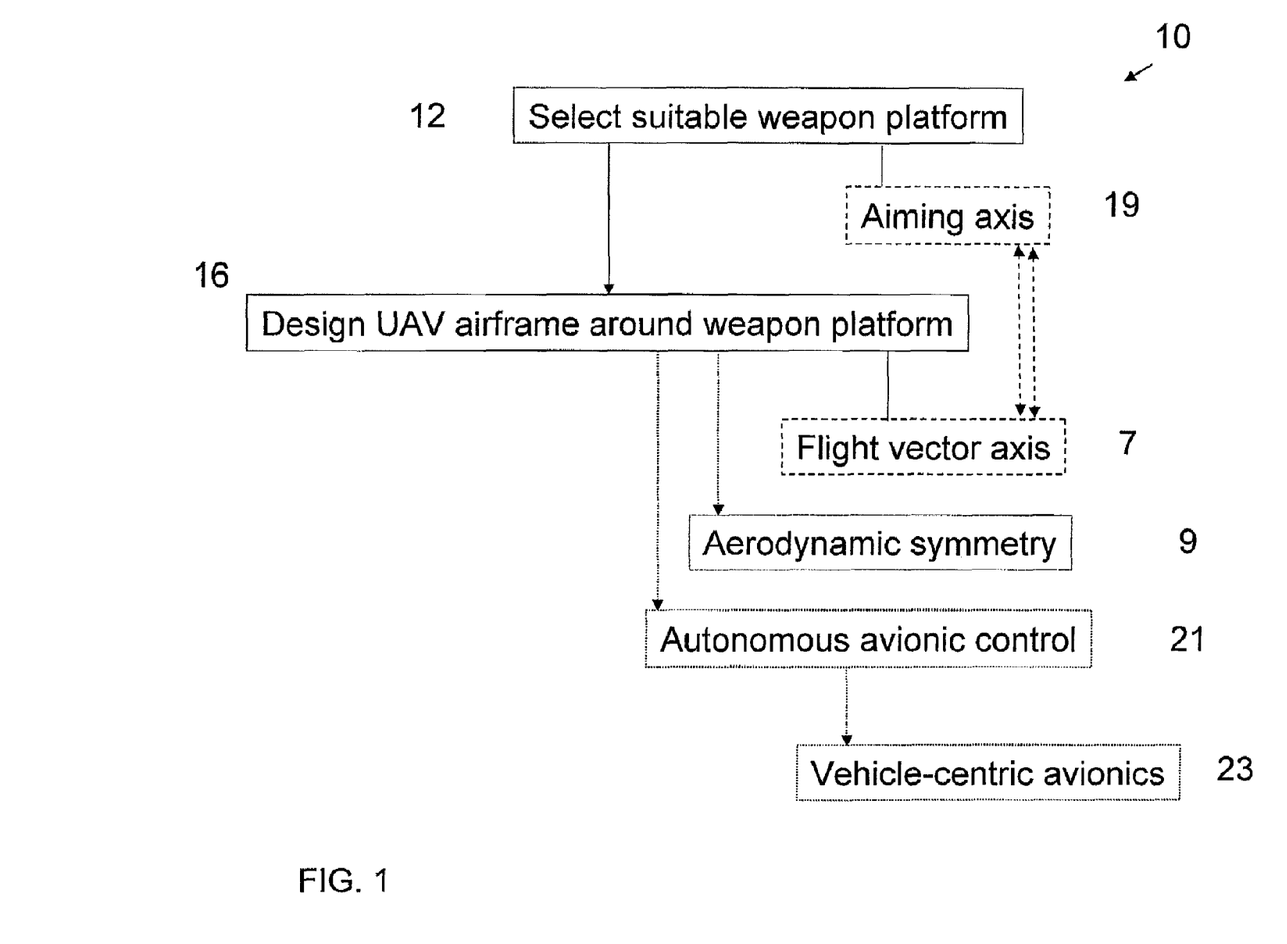
FIG. 1 is a box chart diagram illustrating UAV design method steps according to an embodiment of the invention.

FIG. 1 illustrates an embodiment of the invention directed to a method 10 for designing a small interceptor unmanned air vehicle (UAV). According to the method, the first step of the design process involves selecting a suitable weapon platform at block 12. The choice of a suitable weapon platform is driven by the ability of the UAV interceptor to engage targets at close range and the need to maximize the probability of hitting the target vehicle at least once during an engagement. Additional factors included the consideration of a standardized weapon and ammunition, providing for availability, low production cost and ease of maintainability. The selected weapon platform will have an aiming axis as shown at block 19. A subsequent step in the design process relies on the design and layout of a UAV airframe around the weapon platform as shown at block 16. The UAV airframe will have a flight vector axis as shown at block 7. As will be described in greater detail below, the design methodology involves superimposing the aiming axis of the weapon platform with the flight vector axis of the UAV airframe to the maximum extent possible resulting in a flying weapon, so to speak, whose aim and firing direction is substantially coincident with the flight vector of the UAV. The design method 10 is optimized according to an aspect of the method by designing the UAV airframe to be aerodynamically symmetric as shown at block 9. A key intended attribute of the UAV is precision aiming of the onboard weapon; that is, aiming that is inherently stable and relatively free from asymmetrical flight aerodynamics that induce interceptor orientation preferences. Furthermore, it is desirable that the relatively small and lightweight interceptor airframe be resistant to the shocks introduced by the discharge of the weapon and able to quickly mitigate any unresolved projectile discharge-induced torque effects upon the vehicle's flight path. The use of a symmetrical aerodynamic design increases the overall maneuvering flexibility of the UAV. This includes the use of forward canards to increase the overall maneuvering flexibility while offering the potential of an increased degree and responsiveness of aerodynamic control authority during such maneuvers. An important class of slew maneuvering is considered wherein a purposeful off-vehicle-axis angular offset is introducible as an independent angular departure from the vehicle's flight vector. The resulting solid angle/conical locus of such an offset is introducible/controllable through cooperative, flight torque over-compensating engagement of forward flight control as available from the canard, relative to rear wing and aileron flight control, for the purpose of independent aiming of vehicle weapon and sensors (thus affording a greater range of controllable engagement options). The enhanced control authority of the canard can also be used to more rapidly mitigate shock induced flight path effects during weapons discharge. A principal design consideration also includes providing an avionics system that provides a maximum amount of autonomous control of the UAV as shown at block 21, to allow rapid convergence on threats without the need for human operator intervention unless desired at some point in the interdiction process. This is best achieved by providing a vehicle-centric avionic control system as shown at block 23, including related sensors, which will be described in greater detail below.

Figures 2, 5:
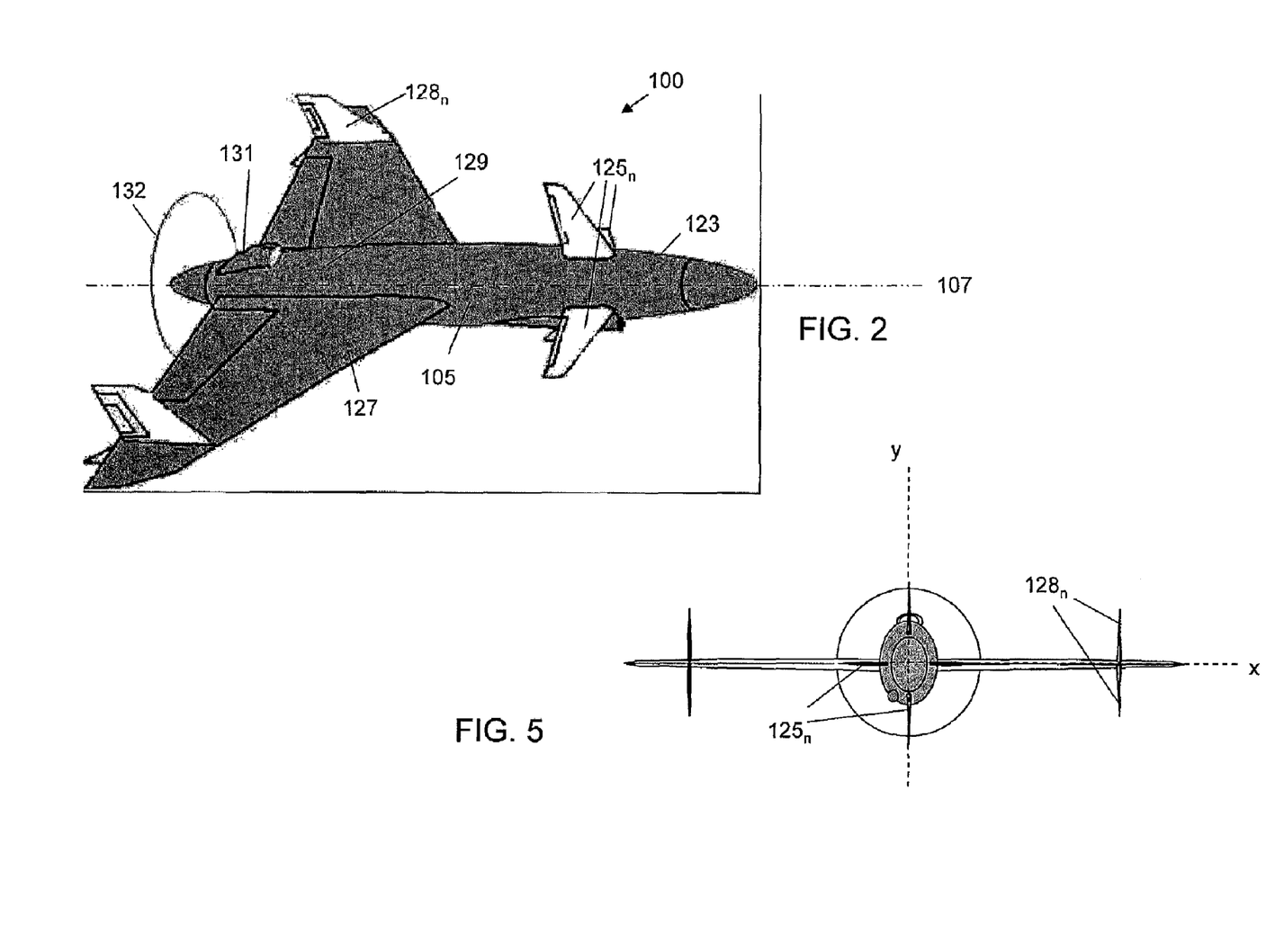
FIG. 2 is a schematic conceptual drawing of a small unmanned air vehicle (UAV) according to an embodiment of the invention.
FIG. 5 is a front elevational schematic view of the UAV shown in FIG. 2.
Figure 3:
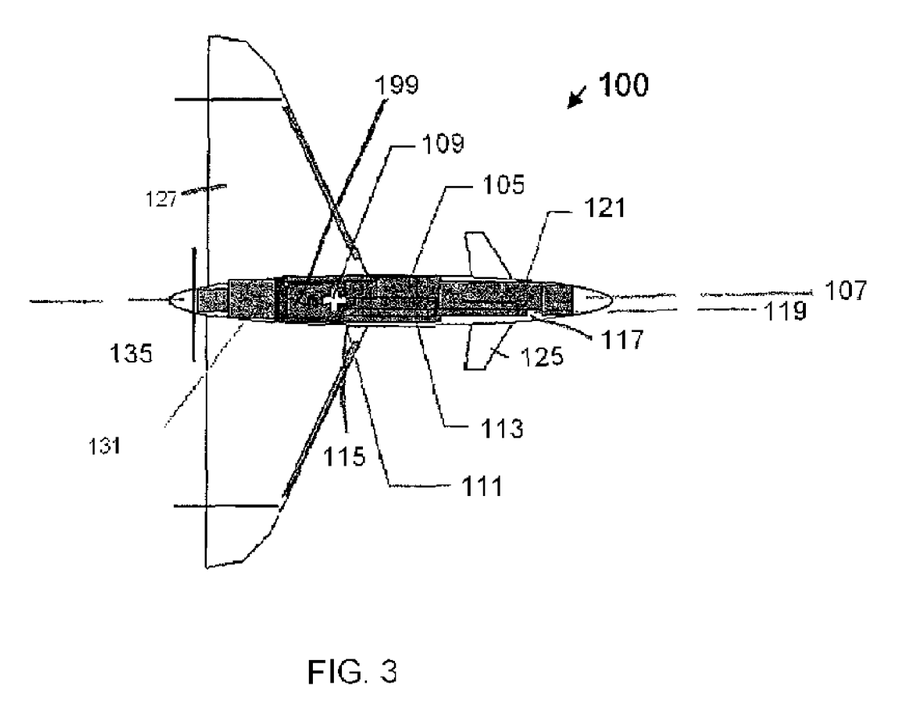
FIG. 3 is a schematic diagram of a UAV airframe according to an embodiment of the invention.
Figure 4:
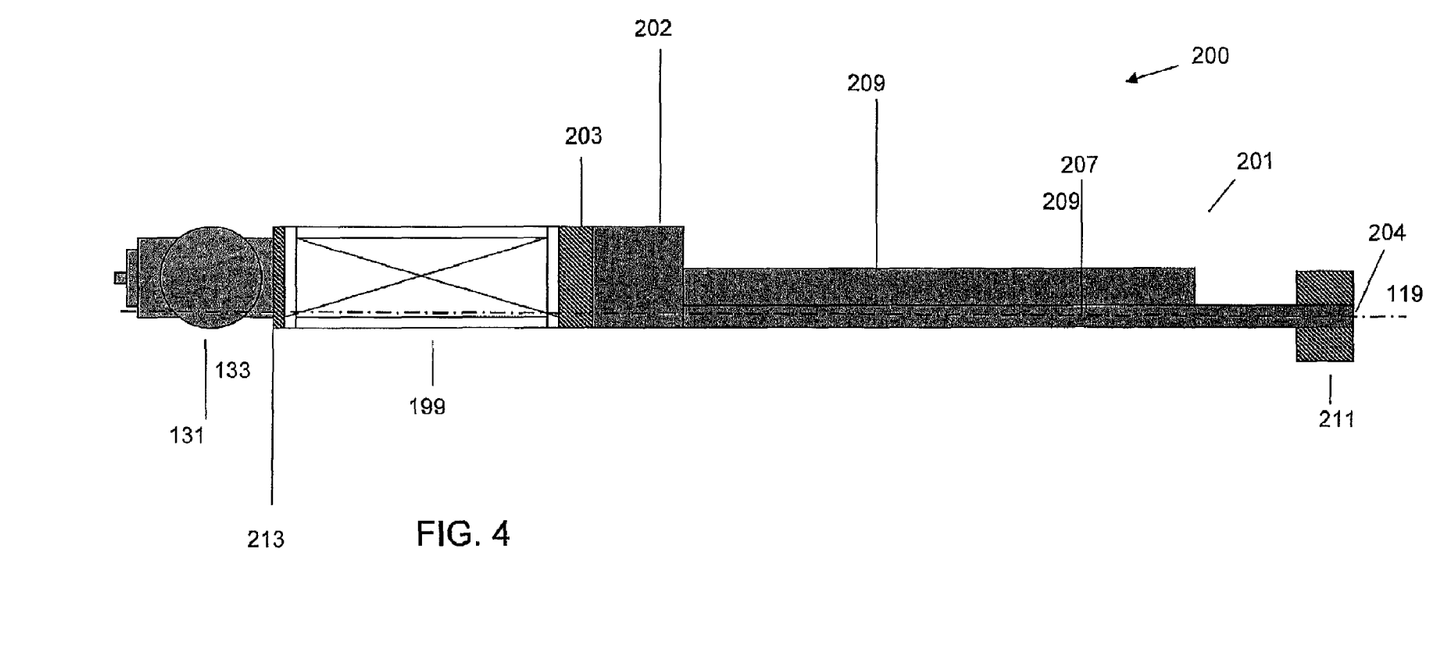
FIG. 4 is a schematic diagram showing UAV airframe and weapon platform integration according to an embodiment of the invention.
Figure 6:
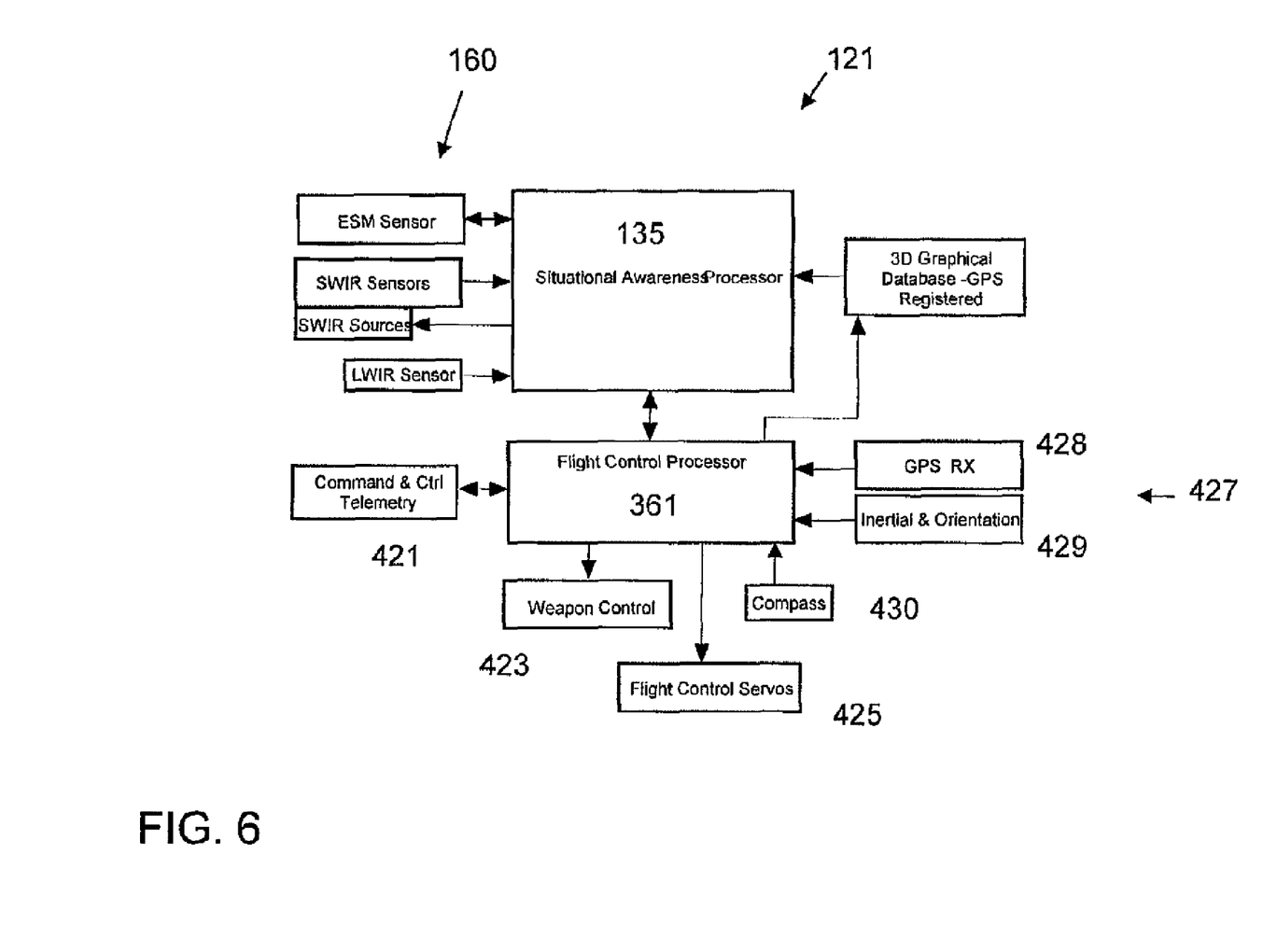
FIG. 6 is a block diagram of an avionics system according to an embodiment of the invention.

Another embodiment of the invention is directed to a small interceptor unmanned air vehicle 100 as illustrated, for example, in FIG. 2 and in FIG. 3. The UAV 100 includes an airframe 105 comprising a fuselage 106, a weapon platform 200, a propulsion system 131, a plurality of canards $125_n$, a primary wing structure 127 and an avionics control system 121. The airframe is constructed around a box beam structure 199 as illustrated in FIG. 4 that structurally links and integrates the major stress and mass components of the UAV. These components include, but need not be limited to, the propulsion system 131 including the UAV engine and electrical power system, the weapon platform 200, the primary wing structure 127, the fuselage 106 and a fuel storage and supply system 109. The fuselage 106 has a longitudinal/rotational flight vector axis 107. The airframe is designed with a center of gravity location 109 in the box beam structure along the flight vector axis 107. A firewall 111 is located immediately forward of the center of gravity location 109. The weapon platform 200 is integrated to the airframe as described in greater detail below. The avionics control system 121 resides in a forward section 123 of the airframe as shown in FIG. 2. A primary wing structure 127 illustrated in FIG. 3 as a non-dihedral delta wing is attached to a rearward section 129 of the airframe. The propulsion system 131 is mounted in the aft end 135 of the airframe. A number of canards $125_n$ are symmetrically positioned about the mid-fore region of the airframe. In order that the UAV have aerodynamic symmetry according to an aspect of the invention, the canards 125 are shown lying along a horizontal (x) axis and a vertical (y) axis as illustrated in FIG. 5. According to an aspect, the wing structure 127 also includes wing stabilizers $128_n$ extending from the top and bottom surfaces of the wing structure as shown in FIG. 5.

According to an aspect illustrated primarily in FIG. 4, the weapon platform 200 is an automatic repeating shotgun 201. In an exemplary aspect, the weapon 200 is a 12-gauge automatic recoilless shotgun having a 15-round magazine utilizing M3 equivalent munitions. The shotgun has a rear firing mechanism end 202 that includes an automatic ammunition feed and ejection components, and a projectile discharge end 204 of a gun barrel 207. The gun barrel 207 is oriented along the fuselage of the airframe and has a longitudinal aiming axis 119 that closely coincides with the flight vector axis 107 of the UAV as shown in FIG. 3. As shown in FIG. 4, the shotgun 201 is anchored to the firewall region 111 of the airframe by a weapon shock mount 203. A gun barrel motion dampener 211 isolates the firing end of the gun barrel from shocking the airframe during weapons discharge, while attenuating subsequent vibrations through mechanical losses. The dampener 211 may comprise multiple discrete segments distributed around the barrel or a doughnut shaped segment disposed around the barrel, for example. Weapon ammunition in the form of multiple pellets referred to as "bird-shot," slugs or other suitable projectiles are stored in the storage component 209 of the weapon adjacent the barrel 207. The shotgun form of the weapon platform 200 provides the advantageous capability of the UAV interceptor to engage small targets at close range while maximizing the probability of hitting these targets at least once during an engagement. The choice of a standardized weapon such as a shotgun, and ammunition, is buttressed by the availability, low cost and ease of maintenance of such a weapon platform. Mounting of the weapon platform near the airframe center of gravity and structurally adjacent the engine and wing attachment acts to combine the major torque inducing components of the interceptor UAV near a common point of the airframe's center of gravity. The forward canards, described above, located at the discharge end of the weapon provide the interceptor UAV with a capability to quickly slew and precisely aim its weapon. It is to be understood that the embodiments of the invention are in no way limited to a shotgun type weapon platform; rather, other suitable weapon platforms may be provided in accordance with the design methodology described herein.

With reference to FIGS. 2 and 4, the UAV propulsion system 131 is an internal combustion engine 133 including a drive propeller 132, which is mounted at the aft end of the airframe via an engine vibration mount 213. The propulsion system may also include the UAV electrical power distribution system integrated to the box beam structure. It is to be understood once again that the propulsion system described herein offers pragmatic advantages based on the tactical, performance and economic considerations of the interceptor UAV. Other UAV propulsion systems known in the art may provide suitable alternatives to the internal combustion/propeller driven system described above.

The integrated functionality of the UAV for directing mission strategy, target detection, tracking and interdiction, as well as mission completion including subsequent redeployment, all substantially under autonomous control of the UAV, is provided by the avionics control system 121 now described in detail with reference to FIGS. 6, 7, 8, 9 and 11. The challenge of a primarily self-sufficiently intelligent UAV capable of implementing threat solutions is highly dependent upon an avionics control system that integrates aerodynamics, flight control, data collection and situational awareness based upon an effective internal world view model that is capable of continuous update.

According to an embodiment, the avionic control system 121 includes a situational awareness processor 135 and a flight control processor 361 in mutual operational connection. The situational awareness processor is operationally integrated to a suite 160 of disparate sensors that can provide a variety of sensor information, which can be fused to assist in the autonomous control of the UAV. As is further shown in FIG. 6, the flight control processor 361 is operationally integrated to a telemetry system 421, a weapon controller 423, flight control components illustrated at 425 and a position data input system 427 that includes a global positioning satellite receiver 428, an inertial and orientation system 429 and a compass 430.

Figure 11:
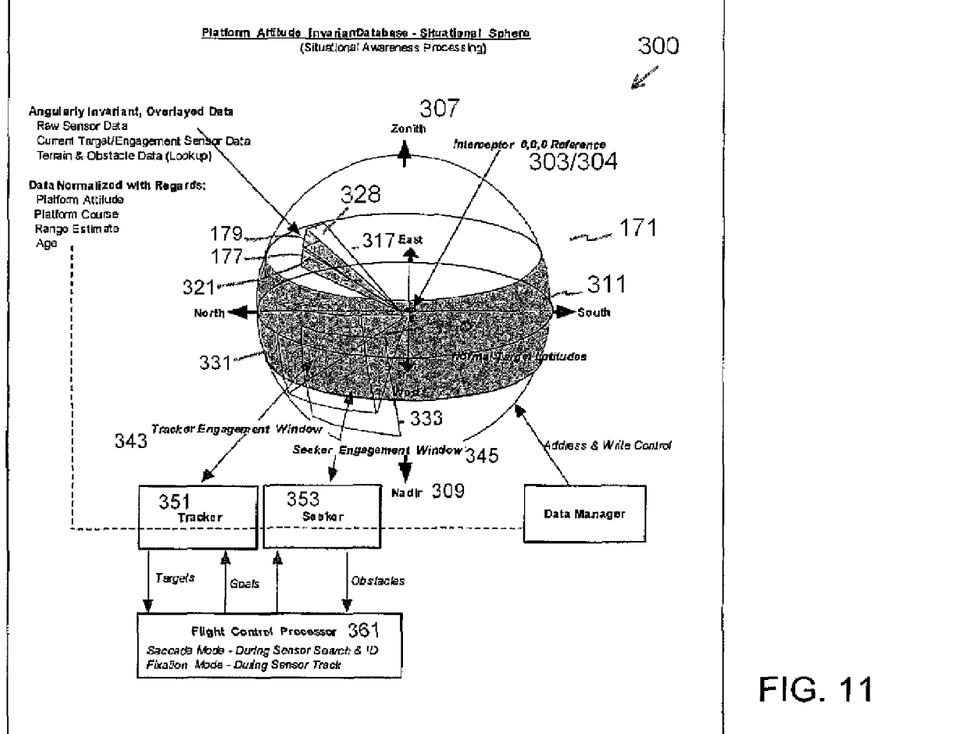
FIG. 11 is a diagrammatic illustration of a situational awareness spherical database architecture according to an embodiment of the invention.

The situational awareness processor 135 further includes a data management system 137 and a vehicle-centric database 139 that is UAV platform-attitude invariant. According to an aspect, the database 139 is a four-dimensional graphical database having a spherical data architecture as illustrated at 300 in FIG. 11. The situational sphere architecture 300 is characterized by an invariant equatorial plane 311 including a two-dimensional directional coordinate/angle system (N, S, E, W) lying in the plane and having a coordinate center (0,0,0) 304 that represents a UAV self-reference point 303. The spherical data base architecture is further characterized by a third-dimensional elevational angle, $\beta$, a zenith (up) 307 and a nadir (down) 309. A radius vector 317 of the situational sphere 300 represents the fourth-dimensional, temporal evolution of sensor data with the most recently updated (or physically closest)

data appearing at the sphere surface. Data, in the form of raw sensor data, target data, engagement data, terrain and obstacle data (provided by both GPS-driven look-up maps and sensor data) and by other sensor data, which is fused and otherwise organized within the situational sphere for selective access and utilization, is represented by angularly invariant volumetric slices 321, 328 of the sphere terminating at an apex at the interceptor reference 303. Similarly, surface portions 331 of a volumetric slice 340 of the sphere represent engagement windows 343, 345 from a target tracker 351 and a target seeker 353, respectively. Sensor data in the form of signals, images and other forms known in the art are input to a data acquisition processor 170 for further utilization by the graphical database 139.

Figure 8:
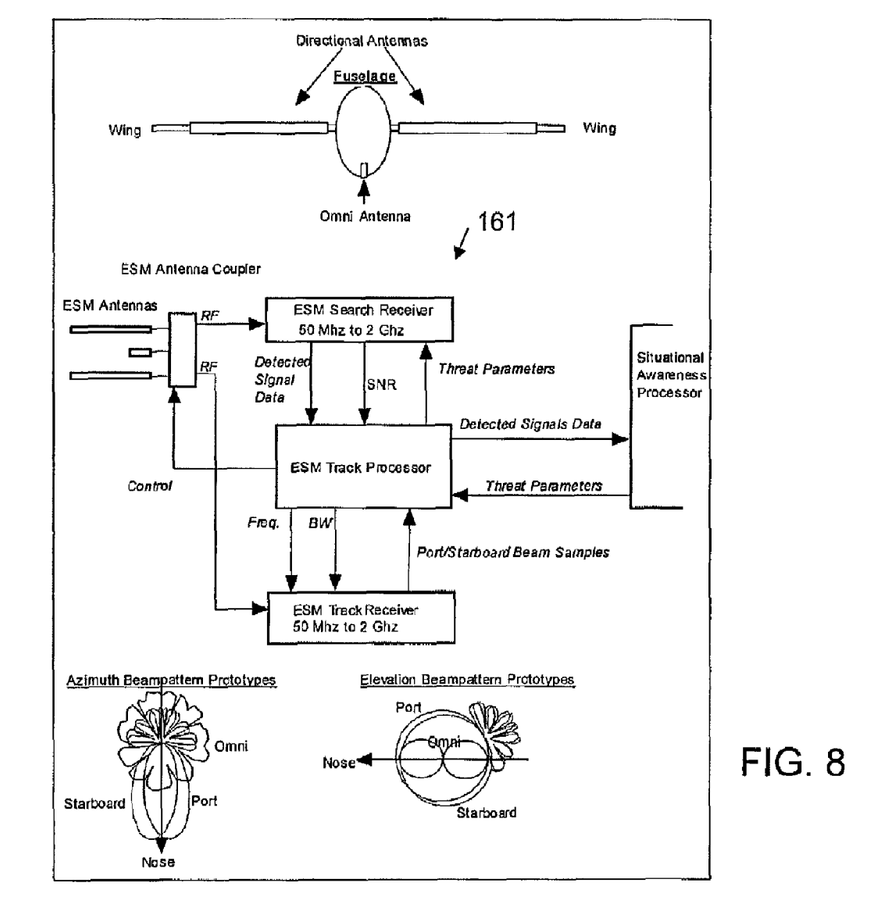
FIG. 8 is a combination schematic and block diagram illustrating a passive radio direction finder receiver sensor according to an exemplary embodiment of the invention.
Figure 9:
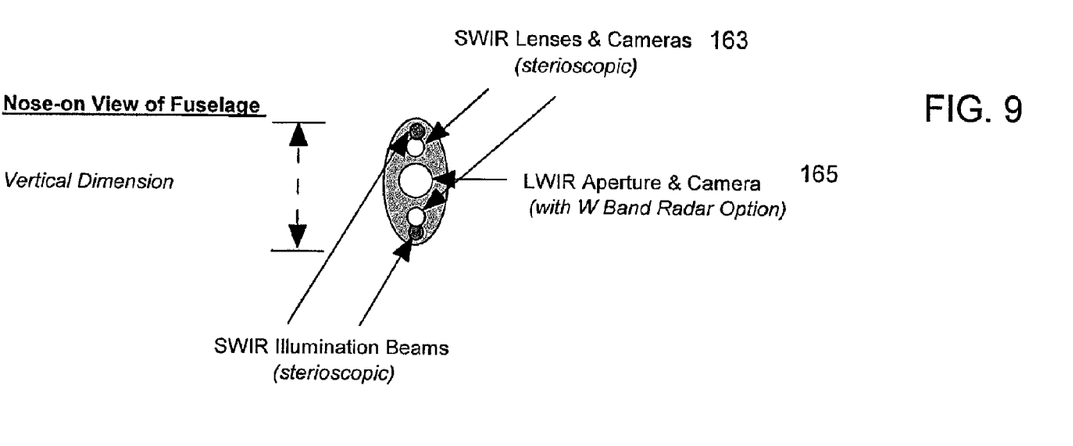
FIG. 9 is a front elevational schematic view of a UAV airframe illustrating forward-looking infrared sensors according to an exemplary aspect of the invention.
Figure 10:
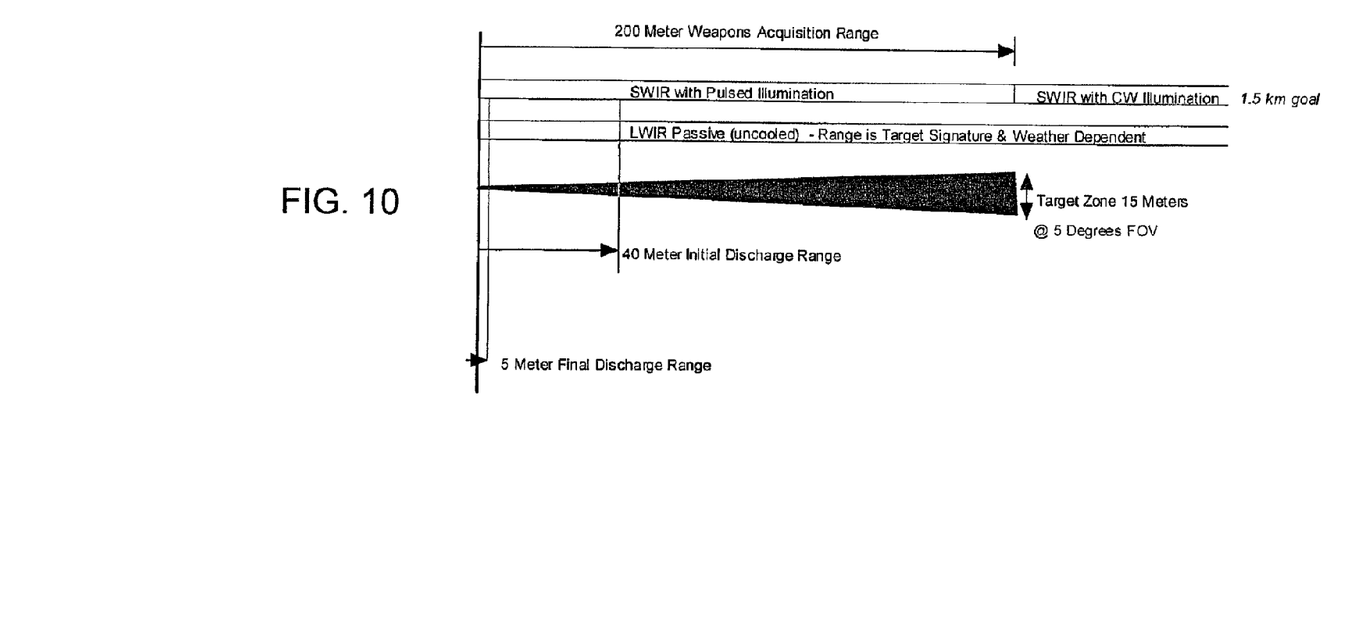
FIG. 10 is a graphical chart illustrating target acquisition ranges for exemplary sensors according to an aspect of the invention.

According to an exemplary embodiment, the suite of sensors includes an electronic surveillance measures (ESM) sensor 161, a short wave infrared (SWIR) sensor 163, SWIR illumination Beams 164, and a long wave infrared (LWIR) sensor 165 operationally coupled to the situational awareness processor. The ESM sensor 161 operates as a passive radio direction finder/receiver. Since many small scale threats such as small, remotely operated vehicles utilize radio communications for both control and sensor data relay, the ESM sensor can detect the radio transmission of these potential threats and utilize radio direction finding to establish a long-range radio bearing to the threat. This can progress to a radio bearing controlled flight along the threat bearing to a point of hand-off to an optical/IR sensor such as 163 and/or 165 for fine tracking and threat lock-on. It should be noted that the use of active light sources in conjunction with imaging sensors provide an active illumination and ranging potential independent from ambient illumination. In the exemplary embodiment, SWIR Beams 164, such as generated from currently available laser and LED technologies, are employed in cooperative engagement with SWIR (imagers) 163 to illuminate objects at near and far ranges to achieve day-night (natural illumination-independent) imaging and stereoscopic ranging of the space near the vehicle. Narrow-band optical filtering options, as available in the art, may be further employed at the SWIR imaging aperture to specifically enhance this active illumination while diminishing natural illuminations, glare and other broader optical bandwidth sources that would otherwise present potential interference. Individual or collective sensor data may provide positive identification of the threat, which the integrated avionics control system can then use to target the on-board weapon for subsequent threat neutralization. The graphical chart in FIG. 10 provides some exemplary sensor acquisition parameters and weapon targeting conditions. FIG. 8 schematically illustrates structural, electronic and signal processing details of the ESM sensor 161, which in and of themselves are not part of the invention per se.

Figure 7:
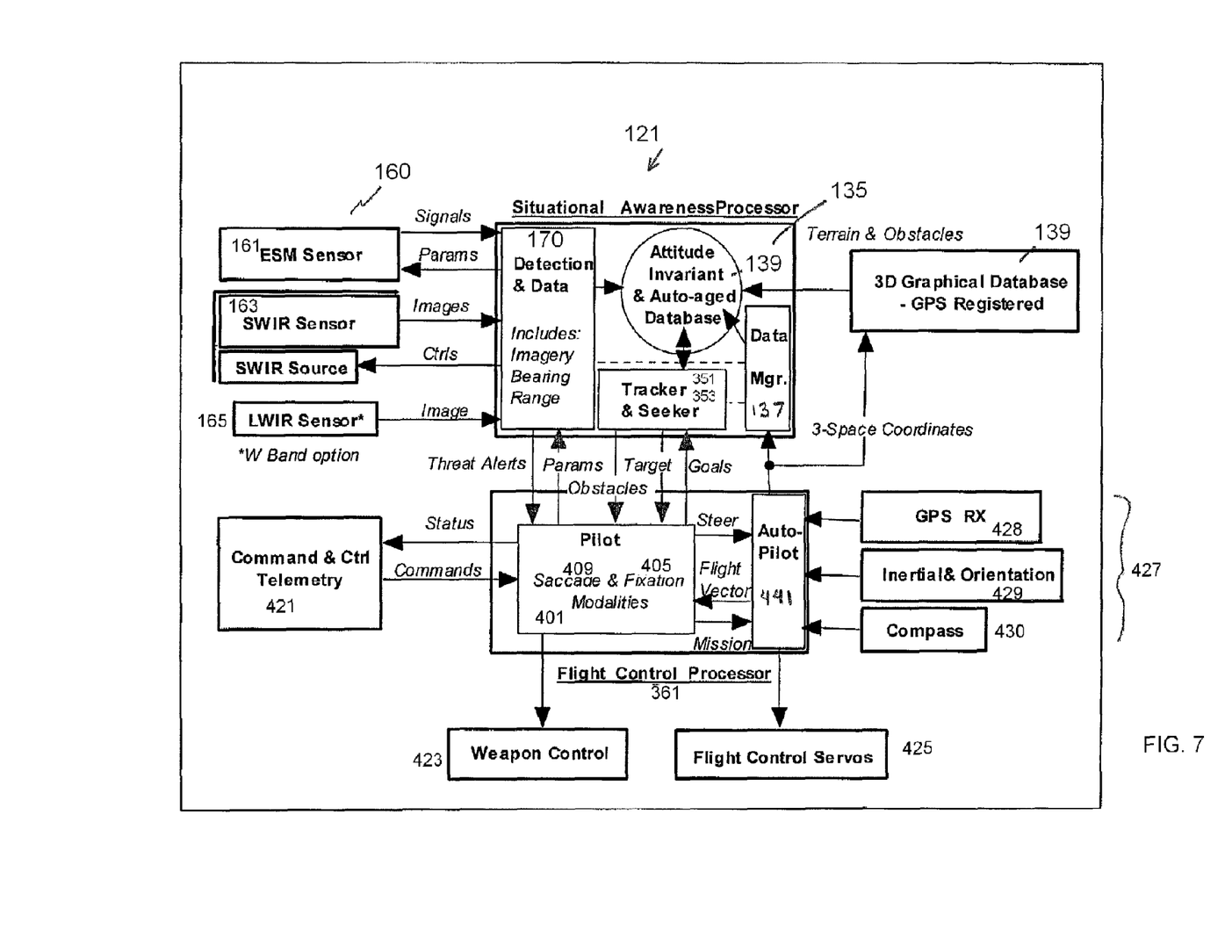
FIG. 7 is a block diagram illustrating detailed components of the avionics system shown in FIG. 6.

The flight control processor 361 of the avionics control system 121 is illustrated schematically in FIG. 7. The flight control processor includes a pilot controller 401 and an autopilot controller 441 that is operationally integrated with the pilot controller. According to an aspect, the pilot controller operates in two modalities, a fixation modality 405 and a saccade modality 407. The pilot controller 401 exchanges status and command information with a command and control telemetry center 421. The pilot controller utilizes command information in the fixation modality to track a prospective threat. The saccade modality, which is UAV platform attitude invariant, uses the fused sensor data from the data processor 170 of the situational awareness processor 135 to continually look for and detect threat targets. The interceptor UAV accomplishes the saccade mode by inducing sufficiently dynamic sensor and platform orientation changes that in turn allow its sensors to collect wide angular fields of data, at constant angular resolutions consistent with each of the sensors employed. Thus the situational awareness sphere is better supplied with data necessary to accomplish detections. The interceptor UAV accomplishes the fixation mode by aligning its flight path in the direction of the threat and inducing sufficient (relatively small) sensor and platform orientation changes that allow the threat to be precisely tracked and intercepted. The pilot controller 401 ultimately issues orders to the weapon platform control 423. The autopilot controller 441 acts as the operational interface between the pilot controller 401 and air control surfaces. The autopilot controller receives positioning and orientation information from the position data input system 427 and utilizes this information to send control commands to the flight control servos 425 for flying the UAV. The autopilot controller provides the pilot controller with flight vector information that the pilot controller processes into steering data and mission data, which is input to the autopilot controller. As shown in FIG. 7, the autopilot controller is operationally interfaced to the data manager 137 and provides positioning and orientation data to the situational database 139.

According to an aspect, UAV safety and flexibility is enhanced by providing the flight control processor with a selectable set of operational modes that parses the degree of autonomy into mission or mission segment-driven options that a human operator can command both before and during execution, as desired. According to an aspect, the operational mode may be automatically configurable. The automatic configurability may be in response to a prospective countering capability of a target. Since the intended design of the interceptor UAV gives priority to key maneuvering performance capabilities beyond the reach of a threat's ability to counter, the flight control configurability is programmed to accommodate differing engagement requirements for different threat capabilities; e.g., "dumb"; "real time controllable"; "smart". Others are possible as a person skilled in the art will appreciate.

According to the various embodiments described herein, the interceptor UAV will trade surveillance and reconnaissance subsystem capabilities, typically associated with conventional UAV platforms, for a highly integrated sensor and weapon system focused on the intercept mission. Furthermore, the UAV airframe will incorporate considerations for high gravitational loads and weapon impulse resistance through center-of-gravity interfaced structures that provide a robust, compact, streamlined airframe capable of surviving multiple engagements and missions. In concept, the small interceptor UAV according to embodiments of the invention is a relatively slow, highly maneuverable, highly persistent and reusable missile that substantially uses self-contained tools to generate operational intelligence for highly autonomous control of the UAV.

The foregoing description of the embodiments of the invention have been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A method for providing enhanced control of an autonomously controlled vehicle, comprising:

provproviding a spherically organized situational awareness data base, wherein at least one independent window is formed as a volumetric slice thereof, the window providing a view of operational data supplied by a sensor platform operationally integrated with the data base; and providing a pilot controller operationally integrated with the spherically organized data base, wherein at least one pilot modality is processed and supplied as a control signal for the vehicle.

2. The method of claim 1, comprising providing each at least one independent window with an independent data processing capability, wherein the processing capability of a plurality of the windows is carried out as a parallel processing function.

3. The method of claim 1, wherein the at least one pilot modality is at least one of a saccade modality and a fixation modality.

4. The method of claim 1, wherein a plurality of the at least one pilot modality are integrated to provide enhanced control of the vehicle.

5. The method of claim 1, wherein the at least one independent window facilitates at least one of a target seeking function and a target tracking function.

6. The method of claim 5, wherein the at least one the target seeking function and the target tracking function includes an obstacle avoidance application.

7. The method of claim 1, wherein the at least one independent window is steered by the pilot controller.

8. The method of claim 7, wherein the steering is performed in consideration of an interceptor mission function.

9. The method of claim 1, comprising providing the operational data directly as angular sensor data.

10. The method of claim 9, wherein the sensor platform comprises a plurality of sensors, wherein each one sensor of the plurality provides its respective operational data as a limited instantaneous field of view represented as a volumetric slice of the spherically organized data base.

11. The method of claim 1, wherein at least some of the operational data comprises range information, further comprising representing said range information as a radial placement within the spherically organized data base.

* * * * *